United States Patent
Asrani (10) Patent No.: US 10,972,760 B1
(45) Date of Patent: Apr. 6, 2021

(54) SECURE TESTING OF VEHICLE ENTERTAINMENT SYSTEMS FOR COMMERCIAL PASSENGER VEHICLES

(71) Applicant: Panasonic Avionics Corporation, Lake Forest, CA (US)

(72) Inventor: Ali Asrani, Flower Mound, TX (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

(21) Appl. No.: 16/810,089

(22) Filed: Mar. 5, 2020

(51) Int. Cl.
| | | |
|---|---|---|
| H04N 7/16 | (2011.01) | |
| H04N 21/214 | (2011.01) | |
| H04N 21/274 | (2011.01) | |
| H04N 21/25 | (2011.01) | |
| B64D 11/00 | (2006.01) | |

(52) U.S. Cl.
CPC ... *H04N 21/2146* (2013.01); *B64D 11/00151* (2014.12); *H04N 21/25* (2013.01); *H04N 21/274* (2013.01)

(58) Field of Classification Search
CPC ... H04N 21/2146; H04N 21/25; H04N 21/274
USPC .......................................................... 725/26
See application file for complete search history.

(56) References Cited

U.S. PATENT DOCUMENTS

| | | | | |
|---|---|---|---|---|
| 6,240,414 B1 * | 5/2001 | Beizer | ................ | G06F 16/1787 |
| 7,196,805 B1 * | 3/2007 | Toebes | ................... | G06Q 50/10 348/211.1 |
| 7,836,472 B2 * | 11/2010 | Brady, Jr. | .............. | H04H 20/62 725/76 |
| 7,984,190 B2 * | 7/2011 | Rhoads | ................. | H04L 67/327 709/248 |
| 8,176,363 B2 * | 5/2012 | Zlotnick | ............. | G06F 11/2082 714/13 |
| 8,649,161 B2 * | 2/2014 | Kato | ................ | H04N 21/41422 361/679.01 |
| 9,041,670 B2 * | 5/2015 | Kobayashi | ....... | H04N 21/42224 345/173 |
| 9,043,826 B1 * | 5/2015 | Patil | ................. | H04N 21/25875 725/30 |
| 9,083,581 B1 * | 7/2015 | Addepalli | ............... | G06F 9/542 |
| 9,226,000 B1 * | 12/2015 | Knight | ................. | H04N 21/231 |
| 9,769,510 B2 * | 9/2017 | Deen | .................. | H04N 21/4508 |
| 10,405,008 B2 * | 9/2019 | Fang | .................. | H04N 21/2143 |

(Continued)

FOREIGN PATENT DOCUMENTS

| | | |
|---|---|---|
| CN | 108639352 A | 10/2018 |
| WO | 0052550 A2 | 9/2000 |

*Primary Examiner* — Michael B. Pierorazio
(74) *Attorney, Agent, or Firm* — Perkins Coie LLP (57) ABSTRACT

Vehicular systems located in commercial passenger vehicles are tested and maintained for operational effectiveness. This patent document describes techniques to perform secure testing on multiple seatback monitors that are located on or in seats in a commercial passenger vehicle and that are associated with a vehicle entertainment system. An example method can determine whether multiple sets of usernames and passwords received by a device authorize a person operating a test-related software on the device to securely test one or more groups of multiple seatback monitors in the commercial passenger vehicle. The example method can also enable selection of a group of multiple seatback monitors that can be specifically tested.

20 Claims, 7 Drawing Sheets

(56) References Cited

U.S. PATENT DOCUMENTS

| | | | |
|---|---|---|---|
| 10,432,612 B2 | 10/2019 | Watson et al. | |
| 2006/0174285 A1* | 8/2006 | Brady, Jr. | H04N 21/2146 725/76 |
| 2007/0106771 A1* | 5/2007 | Lucash | H04L 67/1095 709/223 |
| 2007/0130591 A1 | 6/2007 | Brady et al. | |
| 2007/0250873 A1* | 10/2007 | Ohyama | H04L 65/608 725/82 |
| 2008/0016081 A1* | 1/2008 | MacMillan | G06F 16/437 |
| 2008/0016196 A1* | 1/2008 | MacMillan | H04L 43/00 709/223 |
| 2010/0284668 A1* | 11/2010 | Knight | H04N 21/274 386/248 |
| 2011/0167460 A1* | 7/2011 | Tranchina | H04N 21/426 725/75 |
| 2012/0112694 A1* | 5/2012 | Frisch | G07C 5/008 320/109 |
| 2013/0021479 A1* | 1/2013 | McLaughlin | G06Q 30/06 348/207.1 |
| 2013/0093958 A1* | 4/2013 | Yoshikawa | H04M 1/7253 348/705 |
| 2013/0144487 A1* | 6/2013 | Suzuki | G06F 17/00 701/36 |
| 2014/0059184 A1* | 2/2014 | Bird | G06F 13/4081 709/219 |
| 2014/0074918 A1* | 3/2014 | Wang | G06F 7/582 709/203 |
| 2014/0257788 A1* | 9/2014 | Xiong | H04N 21/441 704/8 |
| 2014/0366125 A1* | 12/2014 | Murata | G01C 21/362 726/17 |
| 2015/0245078 A1 | 8/2015 | Couleaud et al. | |
| 2015/0334441 A1* | 11/2015 | Sukegawa | G06F 21/44 725/25 |
| 2018/0170550 A1 | 6/2018 | Streckert et al. | |
| 2019/0158378 A1 | 5/2019 | Akin et al. | |

* cited by examiner

SECURE TESTING OF VEHICLE ENTERTAINMENT SYSTEMS FOR COMMERCIAL PASSENGER VEHICLES

TECHNICAL FIELD

This document is directed generally to systems, methods, and apparatus to test in-vehicle entertainment systems for commercial passenger vehicles.

BACKGROUND

Commercial travel has evolved to provide entertainment options to passengers traveling to their destinations. For example, in an airplane or train, entertainment options are provided on monitors located on the back of seats, where the monitors can enable passengers to watch movies or television shows as they travel to their destinations. The monitors can also provide travel related information to the passengers. For example, passengers can view a map with the current location of the airplane or train and an estimated time of arrival to their destinations. Thus, in-vehicle entertainment systems can be designed to provide passengers with a positive travel experience.

SUMMARY

This patent document describes exemplary systems, methods, and apparatus to test in-vehicle entertainment systems in commercial passenger vehicles.

An example method of performing secure testing of devices in a commercial passenger vehicle comprises receiving a first set of username and password associated with a person; performing a first determination that the first set of username and password associated with the person is authorized to access a test software; receiving a second set of username and password to access the test software; performing a second determination that the second set of username and password enables access to the test software; receiving a third set of username and password to access a server located in the commercial passenger vehicle; sending the third set of username and password to the server; receiving, from the server, an indication that the third set of username and password enables secure access to the server, where the secure access to the server enables access to media playback devices associated with a vehicle entertainment system in the commercial passenger vehicle, and where the media playback devices are located on or in a plurality of seats in the commercial passenger vehicle; and displaying a test-related graphical user interface (GUI) that facilitates testing of one or more groups of media playback devices in the commercial passenger vehicle, where the test-related GUI is displayed in response to the performing the first determination, the performing the second determination, and the receiving the indication.

In some embodiments, the displaying the test-related GUI further comprises: displaying a list of a plurality of groups of media playback devices to be tested in the commercial passenger vehicle, where the plurality of groups of media playback devices are associated with the vehicle entertainment system; receiving a selection of a group of media playback devices from the list of the plurality of groups of media playback devices; and performing a test on the group of media playback devices selected from the list. In some embodiments, the performing the test includes: sending one or more commands to the group of media playback devices selected from the list, where the one or more commands trigger one or more media playback devices in the group of media playback devices to perform one or more operations according to the one or more commands.

In some embodiments, after the performing the second determination and before the receiving the third set of username and password, the method further comprises: displaying a plurality of vehicle entertainment systems; receiving a selection of the vehicle entertainment system from the plurality of vehicle entertainment system; and determining, based on the selection of the vehicle entertainment system, a first Internet Protocol (IP) address that facilities communication with the server located in the commercial passenger vehicle, where the third set of username and password is sent to the server using the first IP address. In some embodiments, the test on the group of media playback devices is performed by: determining, based on the selection of the vehicle entertainment system, at least one Internet Protocol (IP) address that facilities communicate with the group of media playback devices, where the one or more commands are sent to the group of media playback devices using the at least one IP address.

In some embodiments, the list of the plurality of groups of media playback devices includes a first group comprising all media playback devices in the commercial passenger vehicle and one or more of a second group comprising a subset of the all media playback devices in the commercial passenger vehicle. In some embodiments, the second group is configured to include media playback devices associated with a type of seating. In some embodiments, the second group is configured to include media playback devices associated with a pre-determined zone or area within the commercial passenger vehicle. In some embodiments, prior to the receiving the third set of username and password, the method further comprises: receiving a fourth set of username and password to access a second server located in the commercial passenger vehicle; sending the fourth set of username and password to the second server; and receiving, from the second server, an indication that the fourth set of username and password enables secure access to the second server, where the secure access to the second server enables access to the server.

In yet another exemplary aspect, the above-described methods are embodied in the form of processor-executable code and stored in a non-transitory computer-readable program medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

An in-vehicle entertainment (IVE) system that can send entertainment content (e.g., audio, movies, television shows, or other videos) to displays located on the back of the seats (e.g., known as seatback monitors) in the commercial passenger vehicle. A seatback monitor may include a computer located in the seat (e.g., bottom of a seat) and a display connected to the connector where the display is located on the back of a seat. The computer of the seatback monitor may include may utilize a custom core software program and one or more software programs when displaying graphical content on a display screen and outputting sound to one or more output ports, e.g., headphone jack(s). The seatback monitor and the associated computer can be considered a media playback device.

Vehicular systems such as IVE systems located in commercial passenger vehicles are tested and maintained for operational effectiveness. An IVE system is tested and maintained to enable, for example, the seatback monitors to operate as instructed by passengers. Thus, for example, in a commercial airplane, a newly installed IVE system may need to be tested at least once before the newly installed IVE system can be used by passengers. In another example, an IVE system may need to be tested once every pre-determined time period (e.g., once every six-month). Thus, this patent document describes technology to securely and efficiently test the IVE system.

Figure 1A:
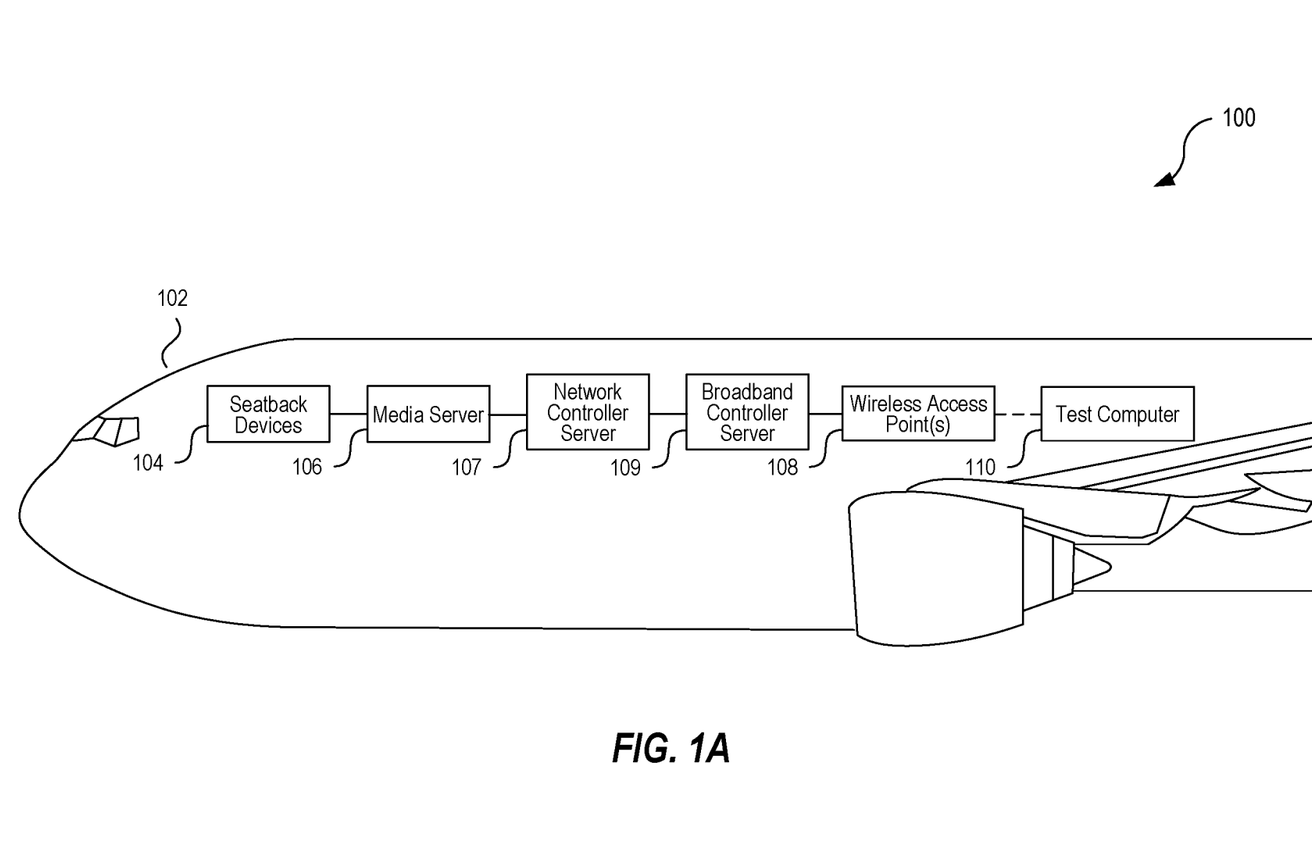
FIG. 1A shows an exemplary overview of a test system for an in-vehicle entertainment (WE) system installed in an airplane.

FIG. 1A shows an exemplary overview of a test system 100 for an in-vehicle entertainment system installed in an airplane 102. The test system includes an media server 106 (or head-end server) that is communicably coupled to the seatback devices 104 to provide multimedia contents (e.g., audio, video, image, webpage, etc.) to the seatback devices 104. For example, the media server 106 may send multimedia contents to seatback devices 104 via an Ethernet switch. The media server 106 can send a list of multimedia contents to be displayed on a graphical user interface (GUI) of the seatback devices 104.

After a user selects a particular multimedia content via a seatback device 104, the seatback device 104 send the user's selection information to the media server 106, whereupon the media server 106 can send the selected multimedia content back to the user's seatback device or PED. A seatback device 104 can be considered a media playback device at least because the seatback device can display or play the multimedia content. The seatback devices 104 can include a storage device (e.g., solid state drives) that stores appropriate audio or video codecs to play the multimedia contents provided by the media server 106 or another device (e.g., media hard drive) located onboard the airplane 102.

While FIG. 1A shows the various devices in series for ease of explanation, the various devices can be communicably coupled to each other via a wired or wireless Ethernet switch or router. In an example implementation, the media server 106, a network controller server 107, the broadband controller server 109, and one or more wireless access points 108 can be communicably coupled to each other via an Ethernet switch. The network controller server 107 can control an WE system that includes the media server 106 and/or the one or more seatback devices 104.

In embodiments that include one or more wireless access points 108 as shown in FIG. 1A, the test system 100 may include a broadband controller server 109 that can control operation(s) of the one or more wireless access points 108. As further described in this patent document, the test computer 110 can log into the network controller server 107 and/or the broadband controller server 109 to access the media server 106 and/or the one or more seatback devices 104. In some embodiments, the network controller server and the broadband controller server may be the same server so that a single server may be configured to perform the operations related to the network controller server and the broadband controller server.

The wireless access point(s) 108 can enable personal electronic devices (PED) (e.g., mobile devices or laptops) to connect to the wireless access points(s) 108 so that the PEDs can access and/or play audio or video content from the media server 106. In embodiments where the test system includes the wireless access point(s) 108, a test computer 110 (e.g., a mobile device or laptop) can wirelessly connect to the wireless access point(s) 108 to perform secure test-related operations as further described in this patent document. The test computer 110 can connect to the wireless access point 108 by entering the password for a service set identifier (SSID) associated with the wireless access point 108. The SSID to be used by the test computer may be related to maintenance and may be hidden or not broadcasted. When the test computer 110 is connected to the wireless access point 108, the test-related software stored on the test computer 110 may perform the operations associated with a secure connection module of the test computer to securely connect to and gain access to the network controller server 107 to securely test the seatback monitors 104a-104d of an IVE system.

Figure 1B:
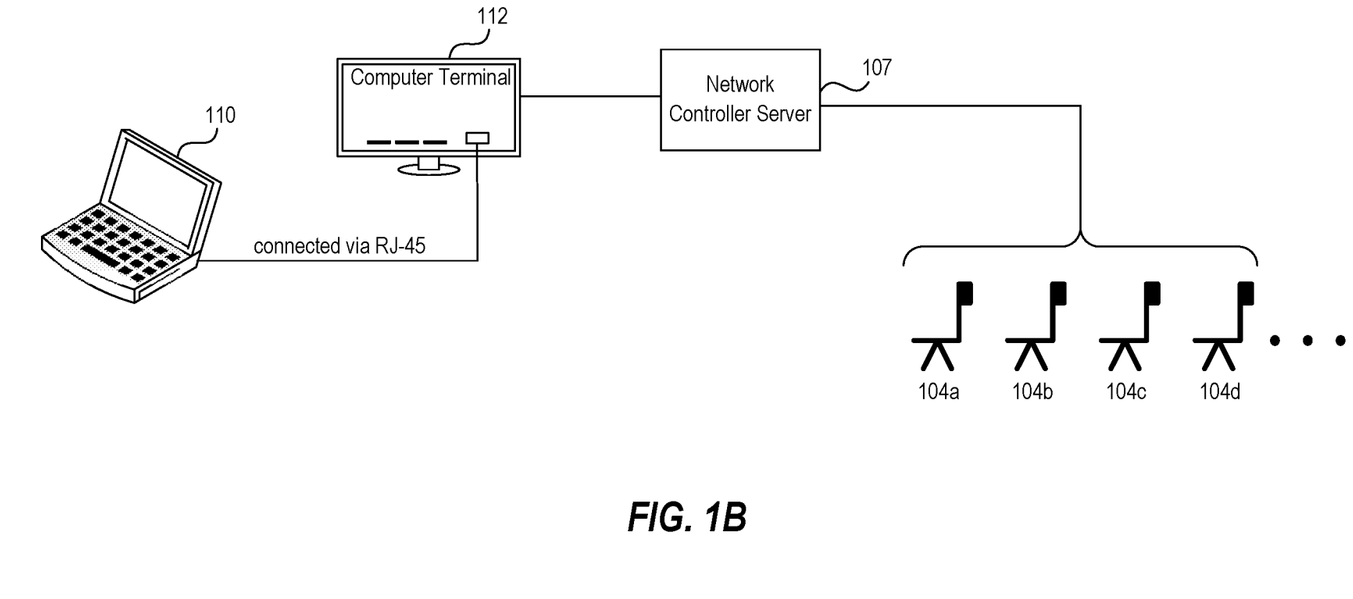
FIG. 1B shows a block diagram of an example scenario to physically connect the test computer to a computer terminal in the commercial passenger vehicle.
Figure 1C:
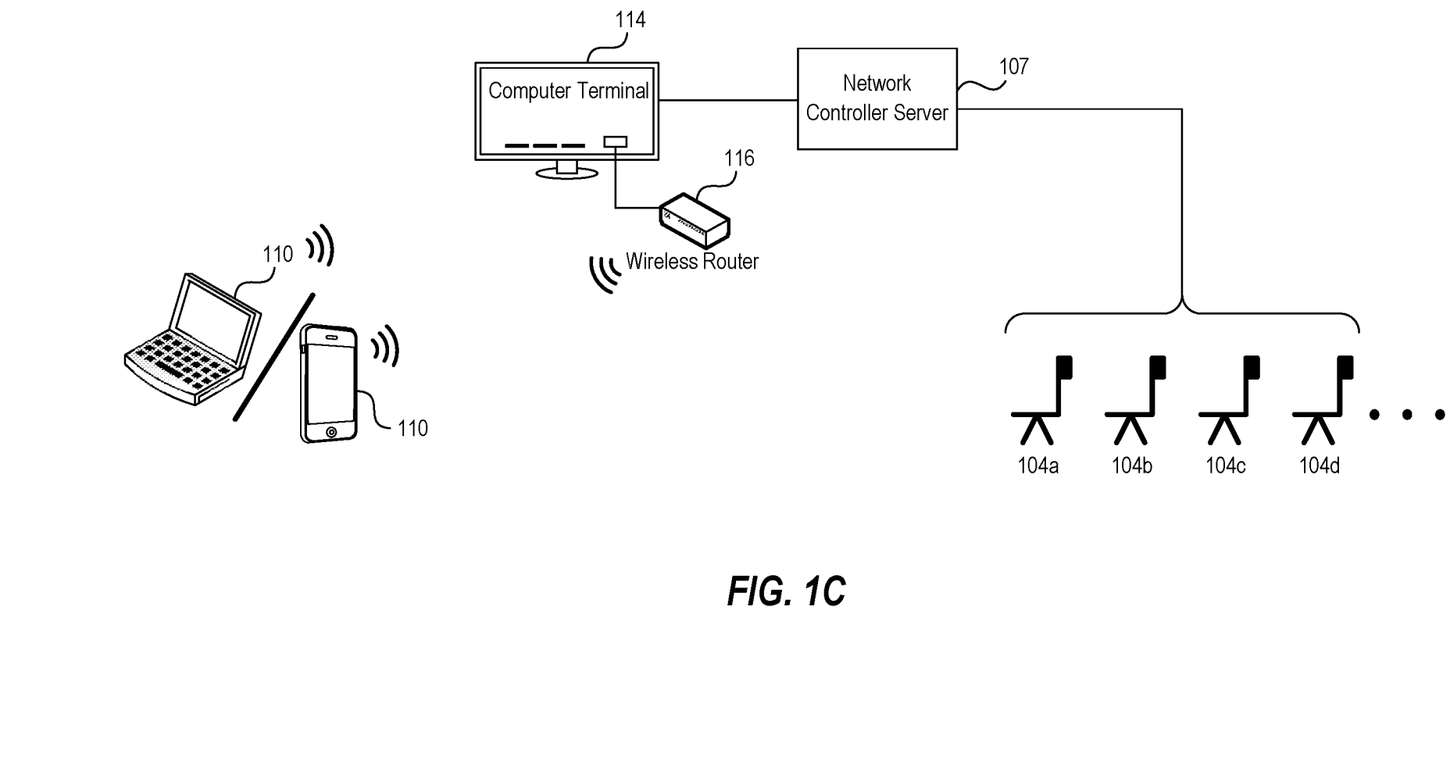
FIG. 1C shows a block diagram of an example scenario to wirelessly connect the test computer to a portable wireless router or portable wireless access point in the commercial passenger vehicle.

In embodiments where the test system 100 does not include the wireless access point(s) 108, the test computer 110 can physically or wirelessly connect to a computer terminal to securely test the IVE system using one of two example techniques shown in FIGS. 1B and 1C.

FIG. 1B shows a block diagram of an example scenario to physically connect the test computer 110 (e.g., a laptop) to a computer terminal in the commercial passenger vehicle. In embodiments where a commercial passenger vehicle may not include a wireless access point, the test computer 110 may directly connect to a computer terminal 112 (e.g., crew terminal) via, for example, an Ethernet cable. The computer terminal 112 is communicably coupled to the network controller server 107 so that the test computer 110 can test the IVE system upon securely accessing the network controller server.

When the test computer is connected to the computer terminal 112, a test-related software stored on the test computer 110 can perform operations associated with a secure connection module of the test computer to securely connect to and gain access to the network controller server 107. Gaining access to the network controller server 107 enables the secure connection module and the test module of the test computer to communicate with the seatback monitors of an IVE system associated with the network controller server 107. Thus, after the secure connection module is allowed to access the network controller server 107, the test module of the test computer can securely test the seatback monitors 104a-104d of an IVE system. The operations performed by the secure connection module and the test module are further described in this patent document in at least Sections A and B below.

FIG. 1C shows a block diagram of an example scenario to wirelessly connect the test computer 110 (e.g., a laptop or mobile device) to a portable wireless router or portable wireless access point 116 in the commercial passenger vehicle. A field engineer or technician may connect the portable wireless access point 116 to the computer terminal 114 for performing the test-related operations using the test computer 110. Thus, the portable wireless access point 116 is communicably connected to the computer terminal 114. The test computer 110 can connect to the portable wireless access point 116 by entering the password for a SSID associated with the wireless access point 116. The SSID to be used by the test computer may be related to maintenance and may be hidden or not broadcasted. When the test computer 110 is connected to the wireless access point 116, the test-related software stored on the test computer 110 may perform the operations associated with a secure connection module of the test computer to securely connect to and gain access to the network controller server 107 to securely test the seatback monitors 104a-104d of an IVE system.

As further explained in Section A below, the secure connection module of the test computer 110 performs operations to securely connect to the network controller server 106 or the IVE system in airplane 102. As further explained in Section B below, the test computer 110 includes a test module that performs operations to test multiple seatback devices 104. The example headings for the various sections below are used to facilitate the understanding of the disclosed subject matter and do not limit the scope of the claimed subject matter in any way. Accordingly, one or more features of one example section can be combined with one or more features of another example section.

A. Secure Connection to an IVE System

The IVE system and other vehicular systems on a commercial passenger vehicle can considered sensitive systems that should be protected against unauthorized access. The example secure connection techniques described in this section provide several operations performed by a secure connection module of the test computer to enable authorized access to the IVE system. Thus, when a test computer connects to an IVE system in a commercial passenger vehicle, the secure connection module can perform certain operations to enable the IVE system to be tested without compromising security.

Figure 2A:
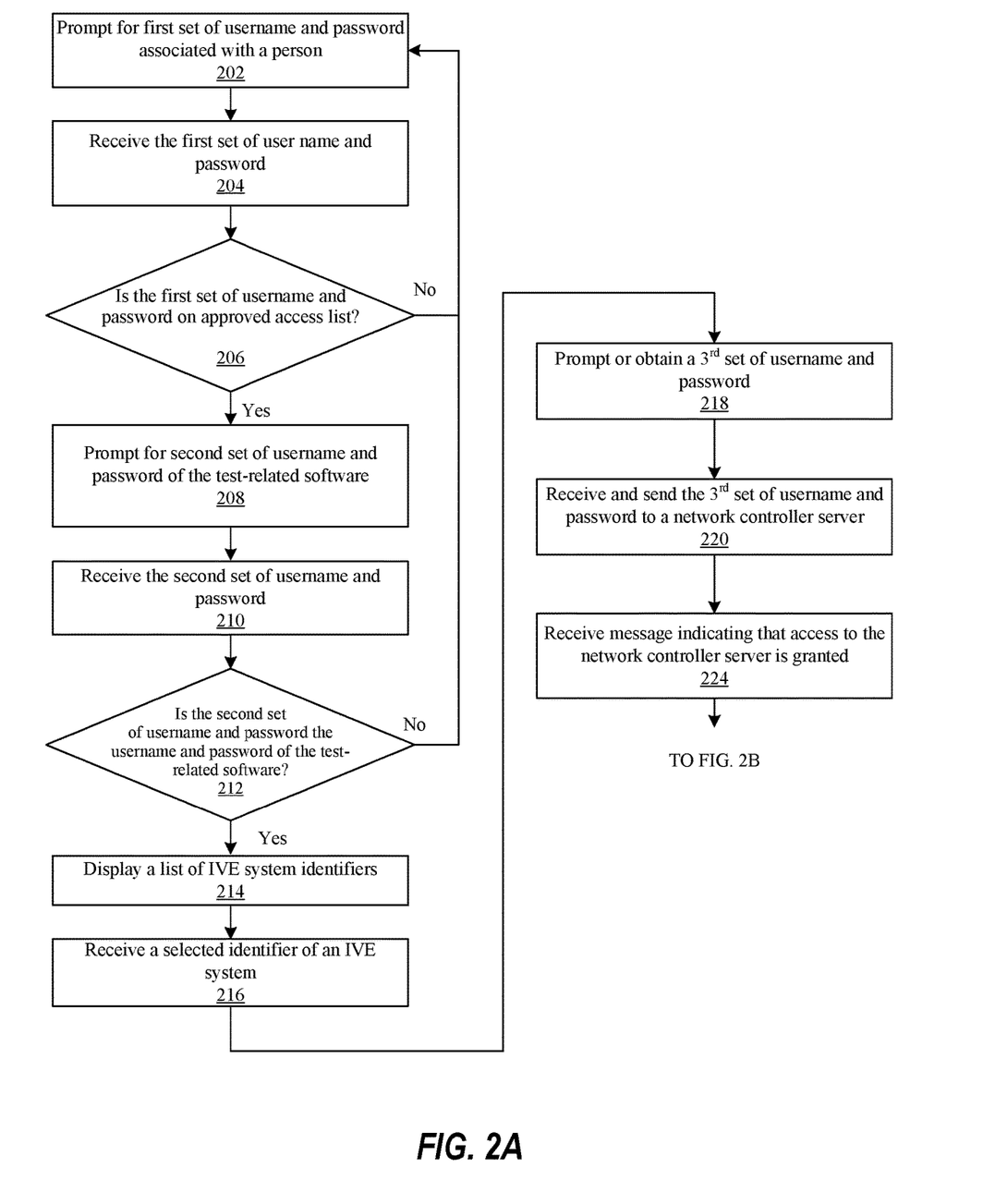
FIG. 2A shows an example flowchart of operations performed by a secure connection module of a test computer to securely connect to an WE system in a commercial passenger vehicle.

FIG. 2A shows an example flowchart of operations performed by a secure connection module of the test computer to securely connect to an IVE system in a commercial passenger vehicle. The test computer may store on its storage device (e.g., hard drive or solid-state drive) a test-related software that can perform operations described for the secure connection module and the test module. The secure connection module performs operations to securely connect to the IVE system.

At operation 202, upon opening a test-related software, the secure connection module can send a first prompt on a graphical user interface (GUI) of the test computer to request a person operating the test computer to enter a first set of username and password associated with an identity of the person operating the test computer. The first set of username and password can be unique to each person operating the test computer. For example, if the person operating the test computer is an employee working as a maintenance worker or a field engineer, such an employee can enter his or her company provided username and password to log into the test-related software. At operation 204, the secure connection module receives the first set of username and password from the person operating the test computer.

At operation 206, the secure connection module determines whether the provided first set of username and password is on an approved list of usernames and passwords. For example, the test computer may include a cellular transceiver with which the secure connection module may send the first set of username and password to an access server located outside of the commercial passenger vehicle and with which the secure connection module may receive an indication from the access server that the first set of username and password are or are not approved to access the test-related software. In another example, the test computer may store the approved list of usernames and password as an encrypted list and may access the encrypted list to determine whether the provided first set of username and password are located in the approved list.

If the secure connection module determines that the provided first set of username and password are not on the access list or if the secure connection module determines, based on the indication received from the access server, that the provided first set of username and password are not on the access list, then the secure connection module can prevent the person from further accessing other aspects of the test-related software by returning to operation 202 and prompting the person to enter an approved username and password. On the other hand, if the secure connection module determines that the provided first set of username and password are on the access list or if the secure connection module determines, based on the indication received from the access server, that the provided first set of username and password are not on the access list, then the secure connection module can proceed to operation 208.

At operation 208, the secure connection module can send a second prompt on the GUI of the test computer to request the person operating the test computer to enter a second set of username and password associated with the test-related software. The test-related software itself may have a login and/or password with which a person can further access the test-related software.

At operation 210, the secure connection module receives the second set of username and password from the person operating the test computer. At operation 212, the secure connection module determines whether the provided second set of username and password is the correct username and password of the test-related software. For example, the test computer may store the correct username and password of the test related application in an encrypted form and the secure connection module may access and decrypt the encrypted correct username and password to determine whether the provided second set of username and password marches the correct username and password. In another example, the secure connection module may send the second set of username and password to an access server located outside of the commercial passenger vehicle and the secure connection module may receive an indication from the access server that the second set of username and password are or are not the correct username and password of the test-related software.

If the secure connection module determines that the provided second set of username and password do not match the correct username and password of the test-related software or if the secure connection module determines, based on the indication received from the access server, that the provided second set of username and password do not match the correct username and password, then the secure connection module can prevent the person from further accessing other aspects of the test-related software by returning to operation 202 or operation 208. On the other hand, if the secure connection module determines that the provided second set of username and password match the correct username and password of the test-reacted application or if the secure connection module determines, based on the indication received from the access server, that the provided first set of username and password match the correct username and password, then the secure connection module can proceed to operation 214. In some embodiments, at operation 208, the second prompt may request only an access password to access the test-related software. In such embodiments, operation 210 can be performed using only the password provided for the test-related software.

At operation 214, the secure connection module displays a list of a plurality of identifiers that identify IVE systems (e.g., IVE system model numbers, IVE system model series, IVE system names, etc.). Each IVE system installed in a commercial passenger vehicle is associated with one IVE system identifier. For example, a Model A Series IVE system installed in a commercial airplane flying internationally may indicate certain capabilities of such a first IVE system, whereas a Model B Series IVE system installed in another airplane flying short distances may indicate certain capabilities of the second IVE system. In this example, Model A Series and Model B Series are examples of identifiers of the IVE systems.

From the plurality of WE system identifiers, the person operating the test computer can select one identifier of the WE system on which the test-related software can perform tests as described in Section B of this patent document. The various WE systems have different communication-related configurations. Using the example mentioned above, the Model A Series IVE system may have a network controller server with a pre-determined Internet Protocol (IP) address of 10.20.21.1, whereas the Model B Series IVE system may have a network controller server with a pre-determined IP address of 190.52.211.8. The test computer can store in its storage device the communication-related configurations of the various WE systems in a look-up table. When the secure connection module receives a selected identifier of an IVE system at operation 216, the secure connection module obtains the communication-related configuration specific to the selected IVE system to be tested.

After the WE system is selected, at operation 218, the secure connection module may use the GUI to prompt the person operating the test computer to enter a third set of username and password related to access the network controller server. In some embodiments, the third set of username and password may be previously stored in the communication-related configuration specific to the selected IVE system so that the secure connection module may obtain or receive the stored third set of username and password from the test computer. In some embodiments, since the seatback monitors are communicably coupled to the media server and the media server communicably coupled to the network controller server, the seatback monitors can be accessed by first logging into the network controller server. The third set of username and password are specific to the network controller server belonging to a specific WE system. Thus, continuing with the example mentioned above, the Model A Series IVE system may have a network controller server with a username and password that is distinct from a username and password of a network controller server associated with the Model B Series IVE system.

At operation 220, the secure connection module receives and sends the third set of username and password to the network controller server using the communication-related configuration (e.g., IP address) of the network controller server associated with the selected IVE system. The secure connection module can send the third set of username and password to the network controller server using, for example, a Secure Shell Protocol (SSH) connection technique.

If the network controller server determines that the third set of username and passwords matches the correct username and password of the network controller server, then at operation 224, the secure connection module receives a message from the network controller server that indicates that access is granted. When the network controller server grants access to the secure connection module, a secure access or a secure connection can be deemed established between the test computer and the network controller server. Thus, the network controller server may enable the test module to access the seatback monitors of the IVE system so that the test module of the test computer can send commands to and/or receive messages from the seatback monitors as further described in Section B of this patent document. The test module of the test-related software can perform test-related operations on the seatback monitors of the selected IVE system after the secure connection module receives the access granted message.

In embodiments where a test system includes a broadband controller server to control wireless access point(s) on a commercial passenger vehicle, before the secure connection module performs operation 218, the secure connection module may use the GUI to prompt the person operating the test computer to enter a fourth set of username and password related to access the broadband controller server. The presence of a broadband controller server, in addition to the network controller server, provides at least two layers of network security and is an advantageous network architecture that can deter unauthorized access to the test system 100. Thus, a fourth set of username and password is an advantageous technical feature that is needed when a multi-layered network security architecture is employed.

In some embodiments, the fourth set of username and password may be previously stored in the communication-related configuration specific to the selected IVE system so that the secure connection module may obtain or receive the stored fourth set of username and password from the test computer. The fourth set of username and password are specific to the broadband controller server belonging to a specific IVE system. Thus, continuing with the example mentioned above, the Model A Series IVE system may have a broadband controller server with a username and password that is distinct from a username and password of a broadband controller server associated with the Model B Series IVE system.

The secure connection module receives and sends the fourth set of username and password to the broadband controller server using the communication-related configuration (e.g., IP address) of the broadband controller server associated with the selected IVE system. The secure connection module can send the fourth set of username and password to the broadband controller server using, for example, a Secure Shell Protocol (SSH) connection technique. If the broadband controller server determines that the fourth set of username and passwords matches the correct username and password of the broadband controller server, then the broadband controller server sends a message to the secure connection module indicating that access to the broadband controller server is granted, whereupon the secure connection module can proceed to operation 218. Thus, access to the broadband controller server enables access to the network controller server.

Requesting at least three sets of usernames and passwords and a selection of a specific IVE system is an unconventional but beneficial security related technical features that can provide secure testing of seatback monitors on commercial passenger vehicles such as airplanes. Thus, the at least three sets of usernames and/or passwords can enable the secure connection module to perform specific checks such as determining whether credentials associated with a person operating the test computer is on an approved list, determining whether the specific username and password needed to access the test-related software is correctly provided, and determining whether the specific username and password needed to access the network controller server is correctly provided. In some embodiments, requesting the two sets of username and/or passwords for embodiments that have a network controller server and a broadband controller server is a beneficial network security related technical features that can also provide secure testing of seatback monitors on commercial passenger vehicles B. Secure Testing of the IVE System After the secure connection module securely connects to the network controller server of a selected IVE system in a commercial passenger vehicle, the test module can perform test-related operations as further described in FIG. 2B. The test module can test one or more operations of a group of a plurality of seatback monitors located on the back of seats in a commercial passenger vehicle. As further explained below, a person operating the test computer can select a group of seatback monitors, where a group may include all seatback monitors in the commercial passenger vehicle or a group of seatback monitors within a seating type or class (e.g., first group of seatback monitors in a business class and a second group of seatback monitors in an economy class) or a group of seatback monitors organized by pre-defined zones or areas (e.g., Zone A includes seatback monitors in Rows 1-3 of business class, Zone B includes seatback monitors in rows 4-6 of business class, Zone C includes seatback monitors in rows 1-7 of economy class, and so on). Thus, instead of individually testing each seatback monitor, the techniques described in Section B of this patent document can be used to test multiple seatback monitors at or around a same time, which is a technically advantageous feature.

Figure 2B:
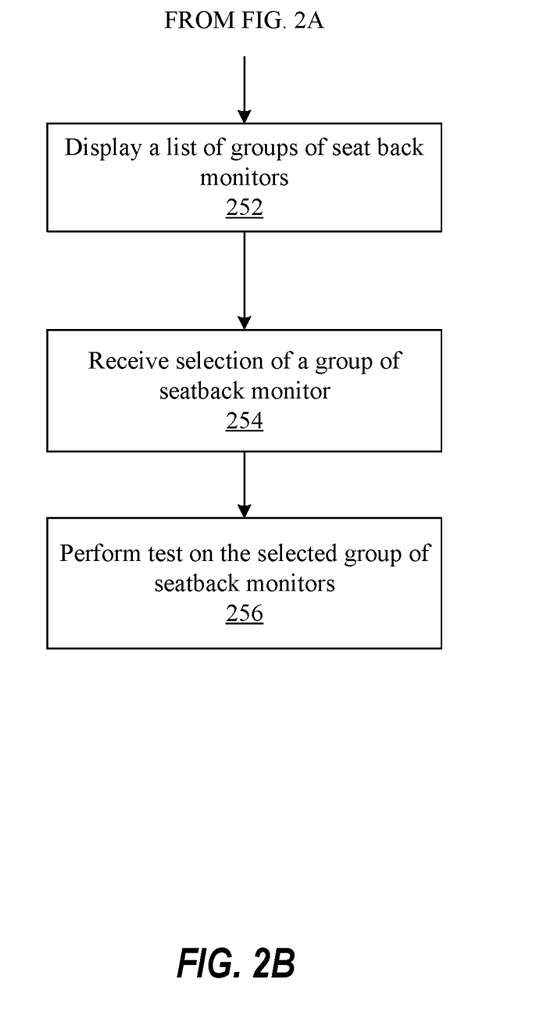
FIG. 2B shows an example flowchart of operations performed by a test module of a test computer to test an IVE system in a commercial passenger vehicle.

FIG. 2B shows an example flowchart of operations performed by a test module of the test computer to test an IVE system in a commercial passenger vehicle. At operation 252, the test module displays on a GUI of a monitor associated with the test computer a list of groups of seatback monitors to be tested. For example, a first group may be displayed as "Test all seatback monitors" which includes testing all of the seatback monitors in the commercial passenger vehicle; a second group may be displayed as "Test seatback monitors by sections" which includes testing seatback monitors in a selected class or type of seating (e.g., either first group of seatback monitors in a business class or a second group of seatback monitors in an economy class); and a third group may be displayed as "Test seatback monitors by zones" which includes testing seatback monitors in a selected zone where each zone may be pre-defined to include multiple seatback monitors.

At operation 254, the test module receives an indication of a selection of group of seatback monitors to be tested from the list of groups. The test module can communicate with the selected group of seatback monitor based on the communication-related configurations of the selected IVE system (as explained in operation 216 in FIG. 2A). In an implementation example, for each IVE system and for each group of seatback monitors, the test computer stores in a look-up table of the communication-related configurations the IP address of a device (e.g., Ethernet switch) that can be used to communicate with the seatback monitors associated with a group of seatback monitors. For example, for testing all seatback monitors for a selected IVE system, the lookup table may store for a broadcast IP addresses for devices (e.g., ethernet switch) associated with all seatback monitors for that selected IVE system, and for testing setback monitors by sections or zones for the selected IVE system, the lookup table may store the IP address(es) of one or more devices (e.g., ethernet switch) associated with the seatback monitors for each section or zone for that selected IVE system.

In some embodiments, upon receiving selection of the "Test seatback monitors by sections" via the GUI, the test module can further display the plurality of seating types or classes (e.g., business class and economy class) so that the person operating the test computer can select a section and its associated seatback monitors to be tested. In some embodiments, upon receiving selection of the "Test seatback monitors by zones" via the GUI, the test module can further display the plurality of pre-defined zones or areas (e.g., business class rows 1 to 3, economy class A to C column, economy class rows 1 to 6, etc.) so that the person operating the test computer can select a zone and its associated seatback monitors to be tested. In some other embodiments, upon receiving selection of the "Test seatback monitors by zones" via the GUI, the test module can further display a prompt where a person operating the test computer can enter a starting and ending location of seatback monitors to be tested (e.g., Row 1 to Row 10).

At operation 256, the test module performs a test on the selected group of setback monitors using the communication-related configuration of the selected group of seatback monitors as mentioned above. In some embodiments, the test may be a script that the test module executes where the script includes pre-defined one or more commands to be performed by the selected group of seatback monitors. The one or more commands can control or navigate or play IVE entertainment content and may include instructions such as "go left" or "go right" or "press enter" or "press menu" or "play a video." The one or more commands are designed to test the operation of the selected group of seatback monitors and whether they respond to software commands provided to them. The test module executes the script by sending the one or more commands to the selected group of setback monitors. In some embodiments, the test module may receive from one or more seatback monitors in the selected group of seatback monitors one or more messages indicating whether the one or more seatback monitors successfully or unsuccessfully executed the command provided by the test module. The test module can generate a log of successful and/or unsuccessful messages received from the one or more seatback monitors and an identifier of each command (e.g., "go up" command or "play a music" command) sent by the test module. The generated log of successful messages can be presented to an authorized person to show that the selected group of seatback monitors are operating properly.

In some embodiments, the test operated by the test module can be based on a selection of one or more commands to be performed by the selected group of seatback monitors. For example, at operation 256, the test module displays a list of one or more selectable commands from which the person operating the test computer can select one or more commands. For example, if a test module receives an indication of a selection of a "go up" command, the test module can send the "go up" command to the selected group of setback monitors. In such embodiments, the test module can generate a log of successful and/or unsuccessful messages received from the one or more seatback monitors and an identifier of each command selected by the person and sent by the test module as explained above.

In some embodiments, the test module can operate a timer that can log out the person operating the test-related software if the test module determines that no activity has been performed with the test-related software after a timer has expired. The timer may have a pre-determined time (e.g., 5 minutes or 10 minutes, etc.). The test-related software can be designed to have limited functionality that can only securely connect to an IVE system and test the seatback monitors in the IVE system. Thus, the test-related software may not include any other functionality related to control of the seat or other vehicular systems.

In some embodiments, at operation 252, the test module can display an option to individually test seatback monitors. For example, the test module can displays on a monitor associated with the test computer a "Test an individual seatback monitor" option which enables the test module to test one selected seatback monitor. In some other embodiments, upon receiving selection of the "Test an individual seatback monitor" via the GUI, the test module can further display a prompt where a person operating the test computer can enter a location of a seatback monitor to be tested (e.g., A01 or B20).

Figure 3:
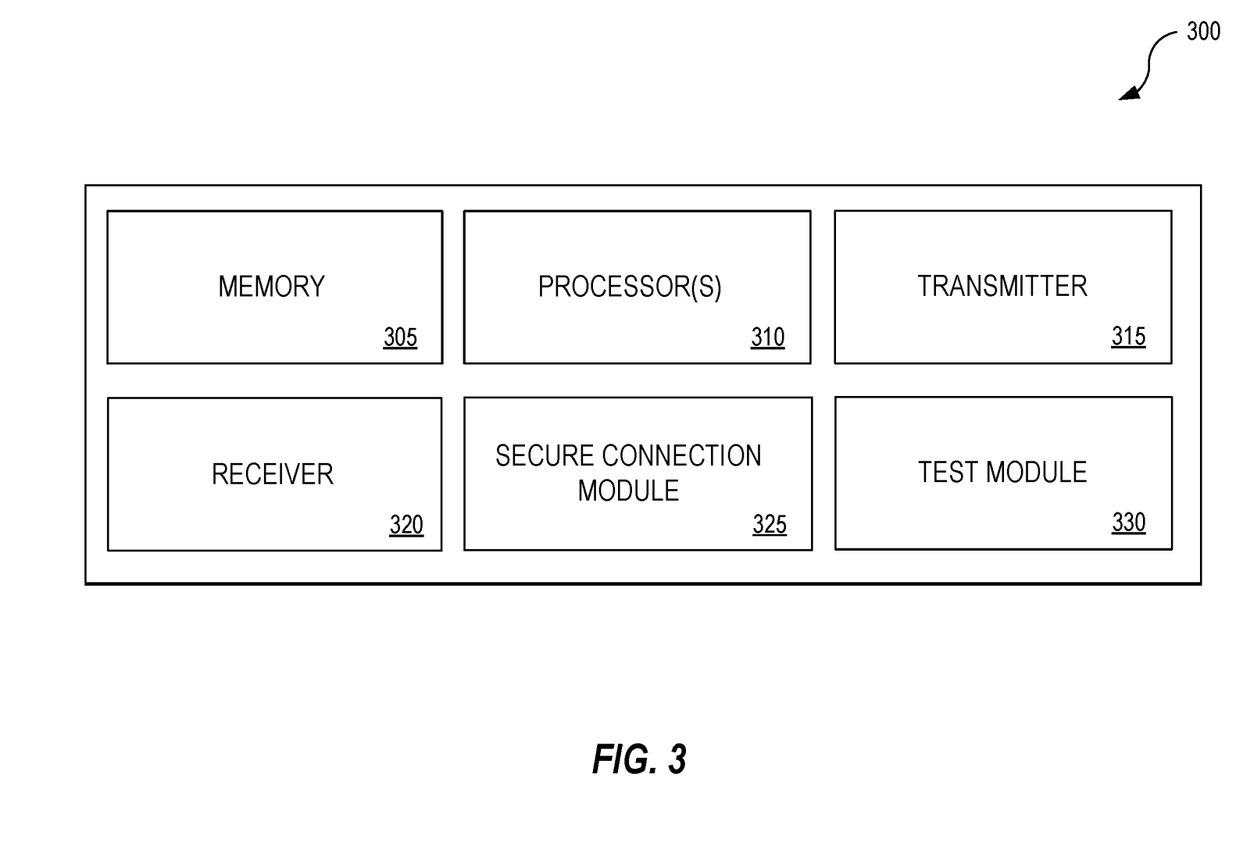
FIG. 3 shows an exemplary block diagram of a test computer that is part of an exemplary test system.

FIG. 3 shows an exemplary block diagram of a test computer that is part of an exemplary test system. The test computer 300 includes at least one processor 310 and a memory 305 having instructions stored thereupon. The instructions upon execution by the processor 310 configure the test computer 300 to perform the operations described in FIGS. 1, 2A, 2B, and 4, and to perform the operations described for the secure connection module 325 and the test module 330. The instructions upon execution by the processor 310 can also configure the test computer 300 to perform the operations described in the various embodiments described in this patent document. The transmitter 315 transmits or sends information or data to another device(s) (e.g., network controller server, access server, or selected group of seatback monitors). The receiver 320 receives information or data transmitted or sent by another device (e.g., network controller server, access server, or one or more seatback monitors from the selected group of seatback monitors).

Figure 4:
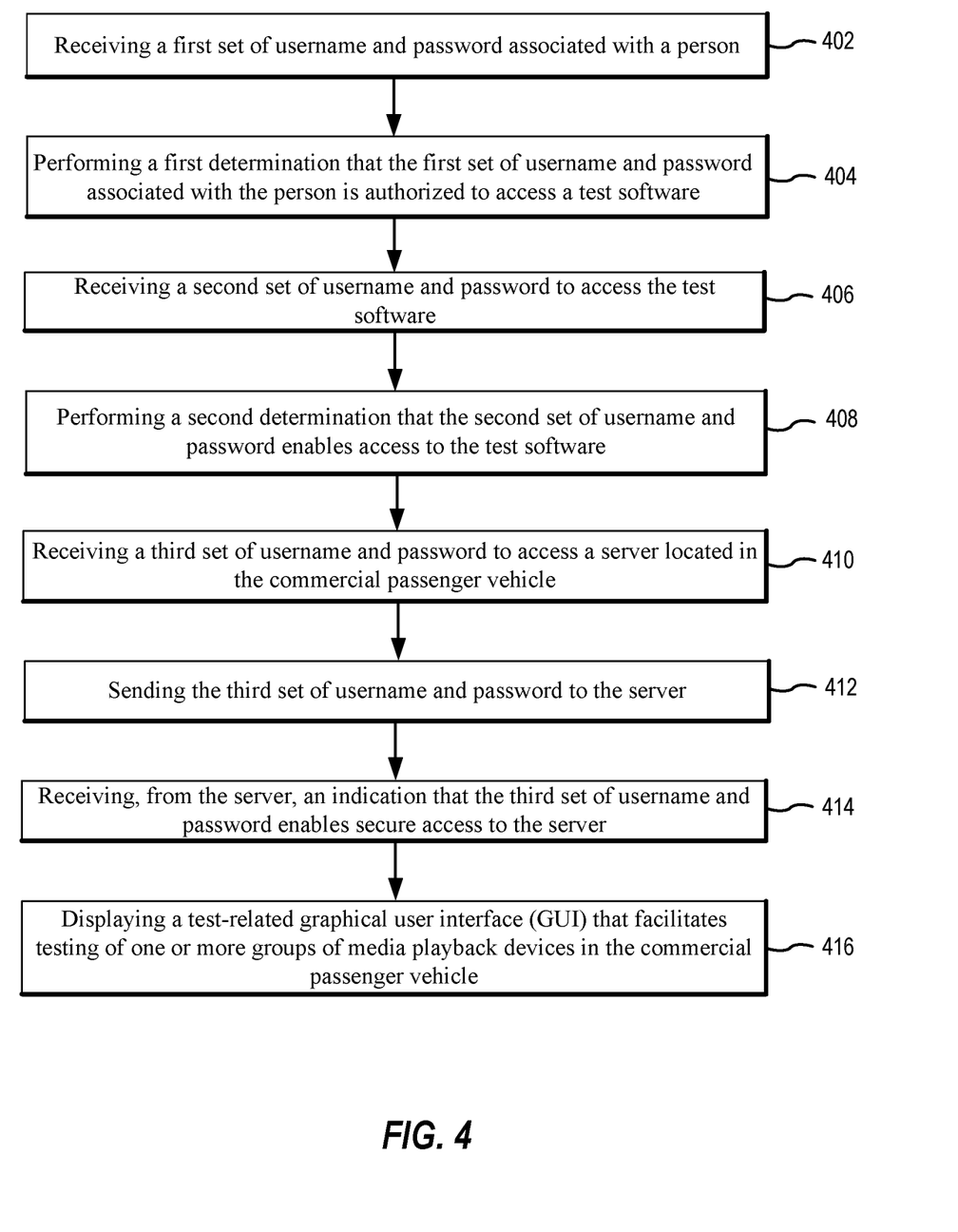
FIG. 4 shows an exemplary flowchart of a method of performing secure testing of devices in a commercial passenger vehicle.

FIG. 4 shows an exemplary flowchart of a method of performing secure testing of devices in a commercial passenger vehicle. At operation 402, a secure connection module receives a first set of username and password associated with a person. At operation 404, the secure connection module performs a first determination that the first set of username and password associated with the person is authorized to access a test software. At operation 406, the secure connection module receives a second set of username and password to access the test software. At operation 408, the secure connection module performs a second determination that the second set of username and password enables access to the test software. At operation 410, the secure connection module receives a third set of username and password to access a server located in the commercial passenger vehicle.

At operation 412, the secure connection module sends the third set of username and password to the server. At operation 414, the secure connection module receives, from the server, an indication that the third set of username and password enables secure access to the server. A secure access may be access provided by the server to an WE system upon receiving a correct username and password. The secure access to the server enables access to media playback devices associated with a vehicle entertainment system in the commercial passenger vehicle. The media playback devices are located on or in a plurality of seats in the commercial passenger vehicle. At operation 416, the test module displays a test-related graphical user interface (GUI) that facilitates testing of one or more groups of media playback devices in the commercial passenger vehicle. The test-related GUI is displayed in response to the performing the first determination, the performing the second determination, and the receiving the indication.

In some embodiments, the displaying the test-related GUI further comprises displaying a list of a plurality of groups of media playback devices to be tested in the commercial passenger vehicle, where the plurality of groups of media playback devices are associated with the vehicle entertainment system; receiving a selection of a group of media playback devices from the list of the plurality of groups of media playback devices; and performing a test on the group of media playback devices selected from the list.

In some embodiments, the performing the test includes sending one or more commands to the group of media playback devices selected from the list, where the one or more commands trigger one or more media playback devices in the group of media playback devices to perform one or more operations according to the one or more commands. In some embodiments, after the performing the second determination and before the receiving the third set of username and password, the method further comprises displaying a plurality of vehicle entertainment systems; receiving a selection of the vehicle entertainment system from the plurality of vehicle entertainment system; determining, based on the selection of the vehicle entertainment system, a first Internet Protocol (IP) address that facilitates communication with the server located in the commercial passenger vehicle, where the third set of username and password is sent to the server using the first IP address.

In some embodiments, the test on the group of media playback devices is performed by determining, based on the selection of the vehicle entertainment system, at least one Internet Protocol (IP) address that facilitates communicate with the group of media playback devices, where the one or more commands are sent to the group of media playback devices using the at least one IP address. In some embodiments, the list of the plurality of groups of media playback devices includes a first group comprising all media playback devices in the commercial passenger vehicle and one or more of a second group comprising a subset of the all media playback devices in the commercial passenger vehicle. In some embodiments, the second group is configured to include media playback devices associated with a type of seating. In some embodiments, the second group is configured to include media playback devices associated with a pre-determined zone or area within the commercial passenger vehicle.

In some embodiments, prior to the receiving the third set of username and password, the method further comprises receiving a fourth set of username and password to access a second server located in the commercial passenger vehicle; sending the fourth set of username and password to the second server; and receiving, from the second server, an indication that the fourth set of username and password enables secure access to the second server, where the secure access to the second server enables access to the server.

This patent document describes the exemplary test system in the context of a commercial passenger vehicle such as an airplane for ease of description. The exemplary test system could be used to test seatback monitors or other display devices in other types of commercial passenger vehicle such as a train, a ship, or a bus.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A method of performing secure testing of devices in a commercial passenger vehicle,
   the method comprising:
   receiving a first set of username and password associated with a person;
   performing a first determination that the first set of username and password associated with the person is authorized to access a test software;
   receiving a second set of username and password to access the test software;
   performing a second determination that the second set of username and password enables access to the test software;
   receiving a third set of username and password to access a server located in the commercial passenger vehicle;
   sending the third set of username and password to the server;
   receiving, from the server, an indication that the third set of username and password enables secure access to the server, wherein the secure access to the server enables access to media playback devices associated with a vehicle entertainment system in the commercial passenger vehicle, and wherein the media playback devices are located on or in a plurality of seats in the commercial passenger vehicle; and
   displaying a test-related graphical user interface (GUI) that facilitates testing of one or more groups of media playback devices in the commercial passenger vehicle, wherein the test-related GUI is displayed in response to the performing the first determination, the performing the second determination, and the receiving the indication.

2. The method of claim 1, wherein the displaying the test-related GUI further comprises:
   displaying a list of a plurality of groups of media playback devices to be tested in the commercial passenger vehicle, wherein the plurality of groups of media playback devices are associated with the vehicle entertainment system;
   receiving a selection of a group of media playback devices from the list of the plurality of groups of media playback devices; and
   performing a test on the group of media playback devices selected from the list.

3. The method of claim 2, wherein the performing the test includes:
   sending one or more commands to the group of media playback devices selected from the list, wherein the one or more commands trigger one or more media playback devices in the group of media playback devices to perform one or more operations according to the one or more commands.

4. The method of claim 3, wherein after the performing the second determination and before the receiving the third set of username and password, the method further comprises:
displaying a plurality of vehicle entertainment systems;
receiving a selection of the vehicle entertainment system from the plurality of vehicle entertainment system; and
determining, based on the selection of the vehicle entertainment system, a first Internet Protocol (IP) address that facilities communication with the server located in the commercial passenger vehicle, wherein the third set of username and password is sent to the server using the first IP address.

5. The method of claim 4, wherein the test on the group of media playback devices is performed by:
determining, based on the selection of the vehicle entertainment system, at least one Internet Protocol (IP) address that facilities communicate with the group of media playback devices, wherein the one or more commands are sent to the group of media playback devices using the at least one IP address.

6. The method of claim 2, wherein the list of the plurality of groups of media playback devices includes a first group comprising all media playback devices in the commercial passenger vehicle and one or more of a second group comprising a subset of the all media playback devices in the commercial passenger vehicle.

7. The method of claim 6, wherein the second group is configured to include media playback devices associated with a type of seating.

8. The method of claim 6, wherein the second group is configured to include media playback devices associated with a pre-determined zone or area within the commercial passenger vehicle.

9. The method of claim 1, wherein prior to the receiving the third set of username and password, the method further comprises:
receiving a fourth set of username and password to access a second server located in the commercial passenger vehicle;
sending the fourth set of username and password to the second server; and
receiving, from the second server, an indication that the fourth set of username and password enables secure access to the second server, wherein the secure access to the second server enables access to the server.

10. An apparatus configured to facilitate secure testing of devices in a commercial passenger vehicle, the apparatus comprising a processor configured to:
receive a first set of username and password associated with a person;
perform a first determination that the first set of username and password associated with the person is authorized to access a test software;
receive a second set of username and password to access the test software;
perform a second determination that the second set of username and password enables access to the test software;
receive a third set of username and password to access a server located in the commercial passenger vehicle;
send the third set of username and password to the server;
receive, from the server, an indication that the third set of username and password enables secure access to the server, wherein the secure access to the server enables access to media playback devices associated with a vehicle entertainment system in the commercial passenger vehicle, and wherein the media playback devices are located on or in a plurality of seats in the commercial passenger vehicle; and
display a test-related graphical user interface (GUI) that facilitates test of one or more groups of media playback devices in the commercial passenger vehicle, wherein the test-related GUI is displayed in response to the perform the first determination, the perform the second determination, and the receive the indication.

11. The apparatus of claim 10, wherein the processor is configured to display the test-related GUI by being configured to:
display a list of a plurality of groups of media playback devices to be tested in the commercial passenger vehicle, wherein the plurality of groups of media playback devices are associated with the vehicle entertainment system;
receive a selection of a group of media playback devices from the list of the plurality of groups of media playback devices; and
perform a test on the group of media playback devices selected from the list.

12. The apparatus of claim 11, wherein the processor is configured to perform the test by being configured to:
send one or more commands to the group of media playback devices selected from the list, wherein the one or more commands trigger one or more media playback devices in the group of media playback devices to perform one or more operations according to the one or more commands.

13. The apparatus of claim 12, wherein after the second determination is performed and before the third set of username and password are received, the processor is further configured to:
display a plurality of vehicle entertainment systems;
receive a selection of the vehicle entertainment system from the plurality of vehicle entertainment system; and
determine, based on the selection of the vehicle entertainment system, a first Internet Protocol (IP) address that facilities communication with the server located in the commercial passenger vehicle, wherein the third set of username and password is sent to the server using the first IP address.

14. The apparatus of claim 13, wherein the processor is configured to perform the test on the group of media playback devices by being configured to:
determine, based on the selection of the vehicle entertainment system, at least one Internet Protocol (IP) address that facilities communicate with the group of media playback devices, wherein the one or more commands are sent to the group of media playback devices using the at least one IP address.

15. The apparatus of claim 11, wherein the list of the plurality of groups of media playback devices includes a first group comprising all media playback devices in the commercial passenger vehicle and one or more of a second group comprising a subset of the all media playback devices in the commercial passenger vehicle.

16. A non-transitory computer readable program storage medium having code stored thereon, the code, when executed by a processor, causing the processor to implement a method comprising:
receiving a first set of username and password associated with a person;

performing a first determination that the first set of username and password associated with the person is authorized to access a test software;

receiving a second set of username and password to access the test software;

performing a second determination that the second set of username and password enables access to the test software;

receiving a third set of username and password to access a server located in the commercial passenger vehicle;

sending the third set of username and password to the server;

receiving, from the server, an indication that the third set of username and password enables secure access to the server, wherein the secure access to the server enables access to media playback devices associated with a vehicle entertainment system in the commercial passenger vehicle, and wherein the media playback devices are located on or in a plurality of seats in the commercial passenger vehicle; and displaying a test-related graphical user interface (GUI) that facilitates testing of one or more groups of media playback devices in the commercial passenger vehicle, wherein the test-related GUI is displayed in response to the performing the first determination, the performing the second determination, and the receiving the indication.

17. The non-transitory computer readable program storage medium of claim 16, wherein the displaying the test-related GUI further comprises:

displaying a list of a plurality of groups of media playback devices to be tested in the commercial passenger vehicle, wherein the plurality of groups of media playback devices are associated with the vehicle entertainment system;

receiving a selection of a group of media playback devices from the list of the plurality of groups of media playback devices; and performing a test on the group of media playback devices selected from the list.

18. The non-transitory computer readable program storage medium of claim 17, wherein the performing the test includes:

sending one or more commands to the group of media playback devices selected from the list, wherein the one or more commands trigger one or more media playback devices in the group of media playback devices to perform one or more operations according to the one or more commands.

19. The non-transitory computer readable program storage medium of claim 18, wherein after the performing the second determination and before the receiving the third set of username and password, the method further comprises:

displaying a plurality of vehicle entertainment systems;

receiving a selection of the vehicle entertainment system from the plurality of vehicle entertainment system; and determining, based on the selection of the vehicle entertainment system, a first Internet Protocol (IP) address that facilities communication with the server located in the commercial passenger vehicle, wherein the third set of username and password is sent to the server using the first IP address.

20. The non-transitory computer readable program storage medium of claim 19, wherein the test on the group of media playback devices is performed by:

determining, based on the selection of the vehicle entertainment system, at least one Internet Protocol (IP) address that facilities communicate with the group of media playback devices, wherein the one or more commands are sent to the group of media playback devices using the at least one IP address.

* * * * *